Nov. 15, 1966  G. A. JOHNSON  3,285,520
ECCENTRICALLY PIVOTED JETEVATOR WITH CONFORMABLE SEAL
Filed Nov. 10, 1964  2 Sheets-Sheet 1

Glenn A. Johnson
INVENTOR.

BY
ATTORNEY.

AGENT.

Nov. 15, 1966   G. A. JOHNSON   3,285,520
ECCENTRICALLY PIVOTED JETEVATOR WITH CONFORMABLE SEAL
Filed Nov. 10, 1964   2 Sheets-Sheet 2

Glenn A. Johnson
INVENTOR.

BY
ATTORNEY.

AGENT.

United States Patent Office 3,285,520
Patented Nov. 15, 1966

3,285,520
ECCENTRICALLY PIVOTED JETEVATOR WITH CONFORMABLE SEAL
Glenn A. Johnson, Kingsville, Md., assignor, by mense assignments, to the United States of America as represented by the Secretary of the Navy
Filed Nov. 10, 1964, Ser. No. 410,334
6 Claims. (Cl. 239—265.35)

This invention relates to thrust vectoring devices particularly adapted for use on solid fuel rockets or the like, and more specifically to a sealing means for application between an exhaust nozzle and a jetevator.

Flight stability and altitude control of rockets without aerodynamic surfaces must be accomplished by controlling the direction of thrust of the rocket jet. Such vector control on rockets of this type may be obtained by deflecting the exhaust gases of the rocket issuing from a discharge nozzle thereof with a movably mounted control member, sometimes called a jetevator, which may be selectively moved into the gaseous jet to deflect the jet and change the direction of thrust thereof, and thereby to effectively alter the direction of flight of the rocket.

One of the major problems encountered by thrust vectoring devices of the type described, which arises from the presence of large quantities of aluminum in the high energy propellants being utilized, is that of the depositing of aluminized propellant on the inner surface of the jetevator which sometimes is sufficient to interfere with the normal operation of the jetevator or even to render the jetevator inoperative. Another problem frequently encountered is that of friction or binding between the nozzle and the jetevator which may result from the thermal distortion and expansion of the nozzle during firing. Still another common problem is that of providing an adequate seal between the nozzle and the jetevator to contain the reverse gas flow induced therebetween upon movement of the jetevator, thereby to protect the jetevator pivots from the hot exhaust gases.

It is therefore an object of this invention to provide a thrust vectoring device for deflecting the exhaust gases from a nozzle and having adequate clearance between the nozzle and the jetevator for eliminating binding therebetween.

Another object of this invention is the provision of a thrust vectoring device wherein the pivots for the jetevator are shielded from the hot exhaust gases.

Yet another object of this invention is the provision of a conformable sealing means for use in thrust vectoring apparatus to adapt to the thermal distortion and expansion of the nozzle during firing.

A yet further object of this invention is to provide a thrust vectoring device in which the maximum sealing force between the nozzle and the jetevator occurs when the jetevator is in the maximum deflected position at which position the maximum flow of the deflected nozzle discharge will strike the seal.

The foregoing objects of the invention, and other objects which will become apparent as the description proceeds, are achieved by an arrangement wherein the control member or jetevator is mounted on a spherical segment formed by the outer surface of the rocket exhaust nozzle and is rotated thereon by an eccentric crank. As the eccentric crank is rotated about its axis through a given angle, clockwise or counterclockwise, the jetevator seal will rotate about the axis of the spherical segment, but at varying distances from this axis. The jetevator seal is adapted to expand or contract to fit the changes in diameter that will occur as the jetevator rotates through its travel, thereby, to conform with the surface of the spherical segment throughout the permissible travel thereover of the jetevator.

For a better understanding of the invention, reference should be made to the accompanying drawings wherein.

Figure 1:
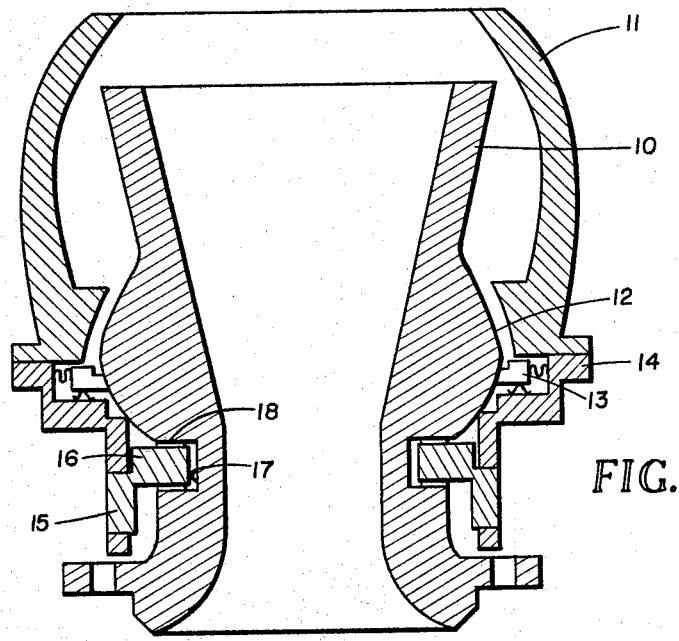
FIG. 1 is a longitudinal section of a rocket nozzle with attached seal and jetevator in accordance with the present invention.

Referring now to the drawings wherein like numerals designate like parts throughout the several figures thereof, there is shown in FIG. 1 a nozzle 10 adapted to be secured to the aft end bulkhead of a solid propellant rocket for discharging the exhaust gases therein produced, a jetevator member 11 rotatably mounted on a spherical segment 12 formed by the outer surface of the nozzle, and a flexible or conformable seal 13 positioned between the jetevator and the spherical segment of the nozzle. The jetevator 11 is fixed to a seal housing 14 and together they are eccentrically pivoted about spherical segment 12 by a pair of eccentric crank elements 15 connected to the seal housing and having the shafts 16 thereof supported within cut-out portion 17 of nozzle 10 by conventional roller bearings 18.

The jetevator control member 11 is shown in its neutral position where it will have no effect upon the gaseous jet discharging from the nozzle 10. As jetevator 11 is pivoted about the eccentric shafts 16, it will move progressively into the jet stream causing larger and larger deflections of the jet which will alter the direction of the thrust thereof and change the direction of movement of the rocket. It should be noted that a relatively large clearance is provided between the outer edge of nozzle 10 and the inner surface of jetevator 11. This clearance is desirable since it serves the purpose of eliminating binding which may result from the expansion and distortion of the nozzle 10 and the metallic jetevator 11 caused by the extreme heat produced within the apparatus during operation, or from the deposition of aluminized propellent on the inner surface of the jetevator.

During operation, when the jetevator 11 is pivoted into the jet stream to alter the direction of flight, a gaseous flow will be induced from the jet into the area between the outer surface of the nozzle 10 and the inner surface of the jetevator control member 1. This reverse flow of the hot exhaust gases is prevented from reaching the jetevator pivots, or crankshafts 16, by the sealing ring 13, thus avoiding any harmful action thereto which otherwise might affect the purposeful operation of the jetevator. Obviously, since the seal moves with the jetevator, it must be capable of expanding or contracting as the jetevator rotates over varying diameters of the spherical segment 12 of nozzle 10 in order to keep the seal free to conform with the surface of the spherical segment.

Figure 3:
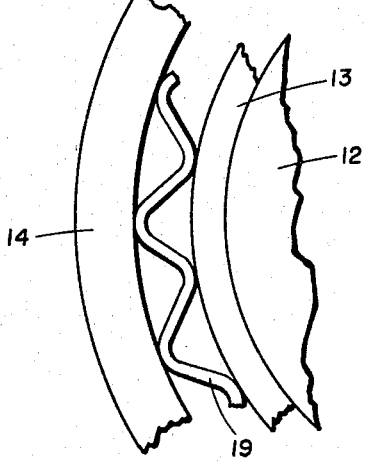
FIG. 3 is a view showing the means for producing the resilient force $x$ in FIG. 2.
Figure 2:
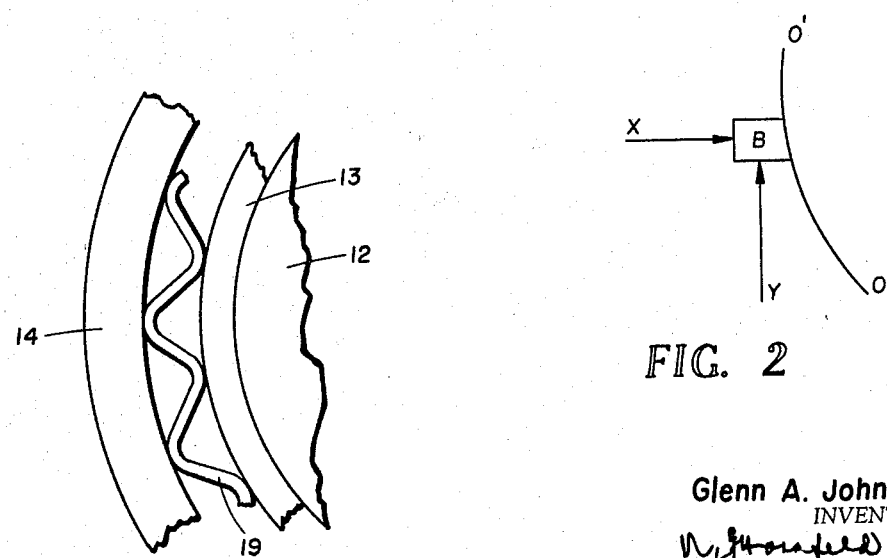
FIG. 2 is a vector diagram illustrating the forces necessary to properly restrain the seal in position on the spherical segment of the nozzle.

Referring now to FIG. 2, is it graphically illustrated that in order for a movable sealing ring B to be properly restrained in position on a spherical segment O–O′, there must be provided two forces $x$ and $y$, acting thereon, which must be resilient just as the seal B must possess elastic properties either from physical characteristics or by design. The means utilized in the illustrated embodiment of the invention for producing the resilient forces $x$ and $y$ consists of a pair of circular corrugated wire springs or strips. In FIG. 3 it may be seen that corrugated spring 19 is positioned between the seal housing 14 and sealing ring 13 thereby biasing the seal against the spherical segment 12 of nozzle 10. Referring back to FIG. 1, it may be seen that two such corrugated resilient members 19 are provided in the assembly for providing the desired $x$ and $y$ forces aforedescribed.

Figure 4:
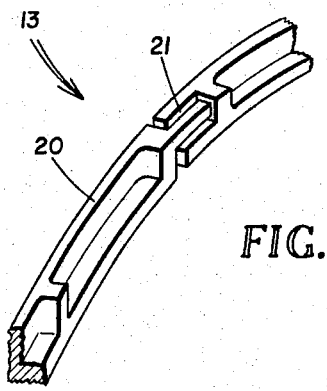
FIG. 4 is a perspective of a suggested design for the sealing ring in the present invention.

One method for obtaining the necessary flexibility in the seal 13 is by using a metal sealing ring comprising a plurality of segments 20 having overlapping joints 21, as shown in FIG. 4. The flexibility of the seal would be determined by the number of segments 20 utilized in making up the ring, and the ring so constructed would be sufficiently flexible to be deflected by the restraining springs 19.

Figure 5:
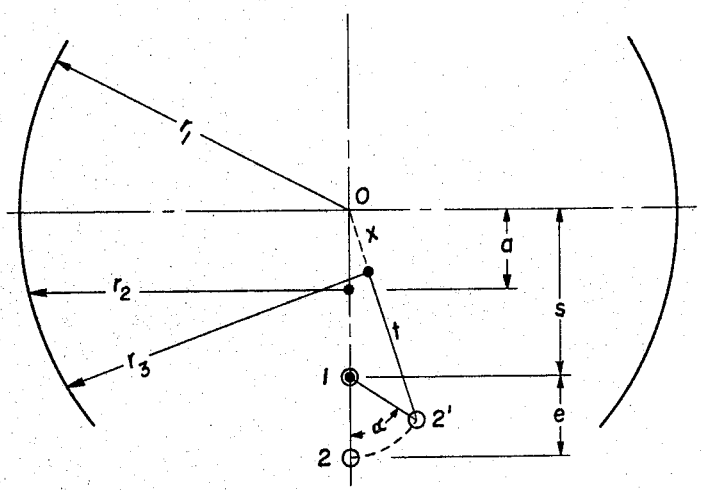
FIG. 5 is a kinematic illustration of the linkage of the jetevator according to the present invention.

The preceding discussion has shown how a jetevator may be pivoted eccentrically about a spherical segment and how a flexible or conformable seal may be designed to conform to changes in the diameter and distortion due to the eccentricity or the thermal expansion. For an explanation of the kinematics of the jetevator linkage, reference should be made to FIG. 5 in the drawings wherein:

$r_1$ = radius of spherical segment
$r_2$ = radius of seal in neutral position
$r_3$ = radius of seal in deflected position
$0$ = center of spherical segment
$1$ = fixed pivot
$2$ = eccentric pivot
$a$ = distance of the plane of the seal from the plane of the great circle of the sphere
$s$ = distance of the fixed pivot from the plane of the great circle of the sphere
$e$ = eccentricity of the pivot
$t$ = length of the jetevator link, normal to $r_3$
$x$ = normal distance of the plane of $r_3$ from the plane of the great circle of the spherical segment.

Thus, $(t+x) = \sqrt{(s+e \cos \alpha)^2 + (e \sin \alpha)^2}$
$(t+x) = \sqrt{s^2 + 2se \cos \alpha + e^2 (\sin^2 + \cos^2 \alpha)}$
$(t+x) = \sqrt{s^2 + e^2 + 2se \cos \alpha}$
$x = (t+x) - t$
$r_2 = \sqrt{r1^2 - a^2}$
$r_3 = \sqrt{r1^2 - x^2}$ From the above, it may be seen that $x$ is a maximum when angle $\alpha = 0$,
$r_2$ is a minimum when angle $\alpha = 0$,
and $r_3$ increases as angle $\alpha$ increases until $x = 0$.

By discrete selection of linkages and pivot positions, the jetevator can be rotated through the desired angle and the seal diameter can be varied as desired. The preceding statement indicates how a jetevator seal may be rotated about the center of a spherical segment and with varying diameter plane circles.

Figure 6:
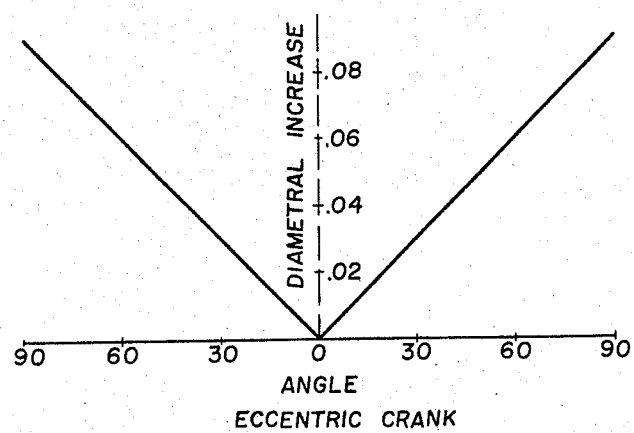
FIG. 6 is a graph depicting the diametral increase of the seal necessary in order for the seal to conform to the spherical segment of the nozzle as the eccentric crank angle is varied to move the jetevator about the nozzle.

Referring now to FIG. 6, a demonstration of the diametral increase experienced by the sealing ring during operation of the device has been achieved by arbitrarily assigning certain values to the fixed quantities and applying them in the above equations.
For example, given $a = 0.5$ inch
$s = 1.75$ inches
$e = 0.5$ inch
$r_1 = 3.0$ inch, then let $\alpha = 90°$, or $\cos \alpha = 0$.
$(t+x) = \sqrt{s^2 + e^2 + 2se \cos \alpha} = \sqrt{1.75^2 + 0.5^2}$
$(t+x) = \sqrt{3.063 + 0.25} = \sqrt{3.313} = 1.820$
$x = (t+x) - t = 1.820 - 1.750 = 0.070$ Then $r_2 = \sqrt{r_1^2 - a^2} = \sqrt{9 - 0.25} = \sqrt{8.75} = 2.958$ and $r_3 = \sqrt{r_1^2 - x^2} = \sqrt{9 - 0.070^2} = \sqrt{8.995} = 2.999$ Thus, when angle $\alpha$ rotates through 90°, the increase in the diameter of the plane circle will be $2(2.999 - 2.958) = 0.082$ inch.

In the same manner, if $\alpha = 60°$, or $\cos \alpha = 0.5$, then $r_3$ becomes 2.985 inches. Thus, when angle $\alpha$ rotates through 60°, the increase in the diameter of the plane circle will be $2(2.985 - 2.958) = 0.054$ inch.

Likewise, if $\alpha = 30°$, or $\cos \alpha = \frac{1}{2}\sqrt{3}$, then $r_3$ becomes 2.970 inches. Thus, when angle $\alpha$ rotates through 30°, the increase in the diameter of the plane circle will be $2(2.970 - 2.958) = 0.024$ inch.

It is apparent from the foregoing that there is provided an improved thrust vectoring device having a novel conformable sealing means between the nozzle and the jetevator which provides a maximum sealing force when the jetevator is in the maximum deflected position at which time the maximum flow of deflected nozzle discharge strikes the seal, thereby affording a more positive shield for the jetevator pivots.

Obviously many modifications and variations of the present invention are possible in the light of the above teachings. It is therefore to be understood that within the scope of the appended claims the invention may be practiced otherwise than as specifically described.

What is claimed is:

1. A thrust vectoring control device for a missile comprising a body portion having a tapered bore terminating in a nozzle opening at one end thereof and an exterior spherical surface formed thereon adjacent said one end,
   a jetevator mounted on said spherical surface of said body portion for limited pivotal movement thereon,
   a conformable sealing means positioned on said spherical surface of said body portion, and resilient means positioned between said jetevator and said conformable sealing means for constantly urging said sealing means against the spherical surface of said body portion.

2. A thrust vectoring control device as defined in claim 1 wherein a relatively large clearance is provided between the outer surface of said body portion and the inner surface of said jetevator.

3. A thrust vectoring control device as defined in claim 1 wherein said sealing means is spring-biased against said spherical segment by a circular corrogated wire spring acting between the sealing means and said jetevator.

4. A thrust vectoring control device for a missile comprising a body portion having a tapered bore terminating in a nozzle opening at one end thereof and an exterior spherical surface formed thereon adjacent said one end,
   a jetevator pivotally mounted on said spherical surface of said body portion and substantially surrounding said one end portion thereof,
   said jetevator being spaced from said body portion adjacent said one end providing a large clearance between the outer surface of said one end of said body portion and the inner surface of said jetevator to prevent binding therebetween,
   an eccentric crank for moving said jetevator relative to said body portion,
   a flexible sealing ring positioned on said spherical surface of said body portion and movable thereon with said jetevator,
   and resilient means positioned between said jetevator and said flexible sealing ring for constantly urging said sealing ring against the spherical surface of said body portion,
   whereby when said eccentric crank is rotated to pivot said jetevator on said body portion for deflecting the gases exhausting from the nozzle opening therein, said flexible sealing ring is free to expand and contract so that it may conform with the spherical surface as it rotates with the jetevator over the varying diameters thereof, thereby shielding the jetevator pivots from the hot exhaust gases.

5. A device according to claim 4 wherein said resilient means consists of a pair of spring elements acting on said sealing ring in directions normal to one another to properly restrain the ring on the spherical surface of the body portion.

6. A thrust vectoring control device as defined in claim 1 in which said resilient means consists of a pair of spring elements acting on said sealing means in directions normal to one another to properly restrain the ring on the spherical surface of the body portion.

References Cited by the Examiner

UNITED STATES PATENTS 3,039,264  6/1962  Ernest _____ 239—265.35

EVERETT W. KIRBY, *Primary Examiner.*